United States Patent
Cho et al.

(10) Patent No.: US 8,270,981 B2
(45) Date of Patent: Sep. 18, 2012

(54) METHOD FOR HANDOFF OF PORTABLE TERMINAL BETWEEN HETEROGENEOUS WIRELESS NETWORKS

(75) Inventors: Eunseon Cho, Daejeon (KR); Namhoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 344 days.

(21) Appl. No.: 12/629,140

(22) Filed: Dec. 2, 2009

(65) Prior Publication Data

US 2010/0136978 A1    Jun. 3, 2010

(30) Foreign Application Priority Data

Dec. 3, 2008   (KR) .................. 10-2008-0121645
Mar. 27, 2009  (KR) .................. 10-2009-0026530

(51) Int. Cl.
  *H04W 36/00*   (2009.01)
  *H04M 3/00*    (2006.01)
  *H04M 1/00*    (2006.01)

(52) U.S. Cl. ........ 455/441; 455/436; 455/418; 455/419; 455/552.1; 455/553.1

(58) Field of Classification Search .......... 455/436–453, 455/418, 550.1, 552.1, 553.1
See application file for complete search history.

(56) References Cited

U.S. PATENT DOCUMENTS

| 7,437,158 | B2 * | 10/2008 | Russell ................ 455/435.2 |
| 2002/0137514 | A1 * | 9/2002 | Mitsugi et al. ............. 455/436 |
| 2007/0093201 | A1 * | 4/2007 | Hsu et al. .................. 455/3.04 |
| 2008/0261597 | A1 * | 10/2008 | Hayama et al. ........... 455/436 |

FOREIGN PATENT DOCUMENTS

| KR | 10-2005-0038736 A | 4/2005 |
| KR | 10-2006-0005599 A | 1/2006 |
| KR | 10-2006-0087069 A | 8/2006 |

OTHER PUBLICATIONS

Soon-Hwa Lee et al., "Handoff Scheme for 'WiBro•WLAN•3G' Integrated Networks in Common Base Station based on SDR," Journals of The Korea Contents Association, 2007, vol. 7, No. 1, pp. 94-102.

* cited by examiner

*Primary Examiner* — Wesley Kim (74) *Attorney, Agent, or Firm* — Rabin & Berdo, P.C.

(57) ABSTRACT

When a receive signal strength received from a target network that will perform the handoff is larger than a reference strength, software related to the target network is previously installed in the corresponding portable terminal, a wireless connection environment with the target network is configured by driving the software related to the target network at the time of determining that the handoff is performed, and performs the handoff to the target network in the portable terminal.

9 Claims, 5 Drawing Sheets

METHOD FOR HANDOFF OF PORTABLE TERMINAL BETWEEN HETEROGENEOUS WIRELESS NETWORKS

RELATED APPLICATIONS

The present application claims priority to Korean Patent Application Serial Number 10-2008-0121645, filed on Dec. 3, 2008 and Korean Patent Application Serial Number 10-2009-0026530, filed on Mar. 27, 2009, the entirety of which is hereby incorporated by reference.

BACKGROUND OF THE INVENTION

1. Field of the Invention

The present invention relates to a method for handoff of a portable terminal between heterogeneous wireless networks, and more particularly, to a method for handoff of a portable terminal between heterogeneous networks for rapidly performing vertical handoff of the portable terminal between the heterogeneous networks of which service areas are overlapped.

2. Description of the Related Art

A next-generation network is expected to be evolved to a type in which various Internet protocol-based wireless networks have overlapped service areas. That is, an environment is created in which the service areas of the wireless networks having different characteristics, which interwork with each other are hierarchically overlapped. The heterogeneous wireless network environments have different wireless characteristics and the service areas of the wireless networks that interwork with each other are hierarchically overlapped, such that various vertical handoff methods are proposed in order to flexibly access an optimal network that is selected depending on the position of a service user, a radio wave environment, a service characteristic, and a user preference, etc.

Among various vertical handoff methods, a method of determining handoff on the basis of positional information of the portable terminal determines the handoff by considering only the positional information of the portable terminal in the environment in which the heterogeneous networks are overlapped. Since the handoff is performed without considering a confusion rate or data traffic of each of the overlapped network, network resources cannot be efficiently utilized. Further, even though a predetermined network can be selected by considering a user's desired service quality and a network service charge in the environment in which the heterogeneous networks are overlapped, a cost saving effect which can be achieved by user selection, etc. cannot be achieved by considering only a strength value of a received signal.

Meanwhile, in a method of determining the handoff by considering information on a movement velocity of the terminal, since a one-time reference velocity threshold value is used, the handoff is determined depending on the movement velocity when the velocity of the terminal is temporarily decreased, for example, when the terminal stops a traffic signal lamp. Therefore, there is a high possibility that a ping-pong effect will occur in the handoff using the reference velocity threshold value.

As such, since the known vertical handoff methods should make many assumptions or reconfigure the current network environment, an additional development cost is generated. Further, the terminal should have various network interfaces in order to support the heterogeneous network handoff. Accordingly, since the terminal should perform an operation for collecting network information corresponding to all network interfaces, power consumption increases.

SUMMARY OF THE INVENTION

In order to solve the above-mentioned problems, an object of the present invention is to provide a method for handoff of a portable terminal between heterogeneous networks so as to more rapidly perform handoff by shortening a reconfiguration time of the portable terminal by installing and disposing target network-related wireless connection application software through previously downloading the software prior to performing the handoff between the heterogeneous networks.

Further, another object of the present invention is to provide a method for handoff of a portable terminal between heterogeneous networks that can prevent unnecessary handoff from being performed and prevent a ping-pong phenomenon caused due to the handoff by reflecting a characteristic of a target network in which the handoff will be performed and a user preference.

In order to achieve the above-mentioned objects, a method for handoff of a portable terminal between heterogeneous networks of which service areas are overlapped according to an embodiment of the present invention includes: verifying whether or not a receive signal strength received from a target network that will perform the handoff is larger than a reference strength; installing software related to the target network in the corresponding portable terminal when the receive signal strength from the target network is larger than the reference strength; and configuring a wireless connection environment with the target network by driving the software related to the target network and performing the handoff to the target network at the time of performing the handoff to the target network.

The reference strength includes at least one of a first reference strength which is a reference receive signal strength for an overlay network having a broadband service area and a second reference strength which is a reference receive signal strength for an underlay network having a narrowband service area which is overlapped with the service area of the overlay network.

The software related to the target network is wireless connection application software that provides the wireless communication environment between the corresponding portable terminal and the target network.

The method for handoff of a portable terminal between heterogeneous networks further includes: verifying whether or not the software related to the target network is provided in the corresponding portable terminal; and receiving the software related to the target network from an SDR server when the software related to the target network is not provided in the corresponding portable terminal, before installing the software related to the target network.

The method for handoff of a portable terminal between heterogeneous networks further includes determining whether or not the handoff to the target network is performed by inquiring a handoff policy registered in the corresponding portable terminal, after installing the software related to the target network.

The handoff policy includes at least one of user preference network information, reference velocity information in a predetermined time section, and reference receive signal strength information to the target network.

Determining whether or not the handoff is performed includes verifying whether or not the target network is a user preference network by inquiring the user preference network defined in the handoff policy.

It is determined that the handoff to the target network is performed only when the target network is the user preference network in the case when the target network is the underlay network.

When the target network is the overlay network while being the user preference network, it is determined whether or not the handoff is performed depending on a comparison result by recomparing the reference strength with the receive signal strength from the target network.

Determining whether or not the handoff is performed includes measuring the movement velocity of the corresponding portable terminal in the predetermined time section; and calculating an average movement velocity in the predetermined time section on the basis of the measured movement velocity.

In the case when the target network is the underlay network, it is determined that the handoff to the target network is performed when the calculated average movement velocity is less than a reference velocity.

In the case when the target network is the overlay network, it is determined that the handoff to the target network is performed when the calculated average movement velocity is larger than the reference velocity.

Determining whether or not the handoff is performed further includes recomparing the reference strength with the receive signal strength from the target network, wherein it is determined that the handoff to the target network is performed when the receive signal strength from the target network is larger than the reference strength and the average movement velocity in the predetermined time section is recalculated when the receive signal strength from the target network is equal to or smaller than the reference strength.

According to an embodiment of the present invention, it is possible to more rapidly perform handoff by shortening a reconfiguration time of a portable terminal by installing and disposing target network-related wireless connection application software through previously downloading the software prior to performing the handoff between the heterogeneous networks in the portable terminal.

Further, it is possible to prevent a ping-pong phenomenon from being generated by reflecting a handoff policy considering a user preference or characteristics of a network such as the strength of a signal received from a target network, an average movement velocity of a terminal, etc. and perform the handoff by reflecting user requirements to the maximum at the time of performing the handoff between the heterogeneous networks.

DETAILED DESCRIPTION OF THE PREFERRED EMBODIMENTS

Hereinafter, embodiments of the present invention will be described in detail with reference to the accompanying drawings.

Figure 1:
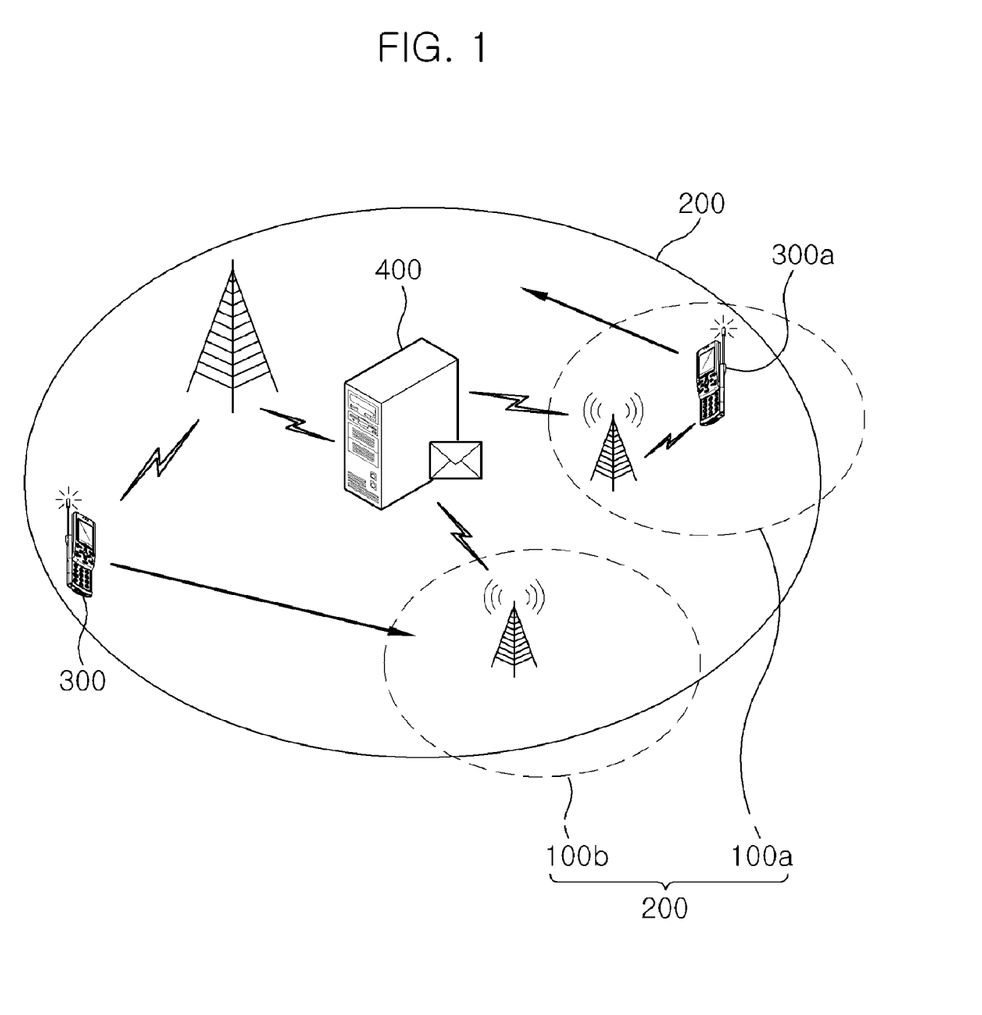
FIG. 1 is a schematic diagram illustrating a configuration of a heterogeneous network according to an embodiment of the present invention.

FIG. 1 is a diagram illustrating a schematic configuration of a heterogeneous network for describing handoff in a portable terminal according to an embodiment of the present invention.

As shown in FIG. 1, a heterogeneous wireless network includes an overlay network having a broadband service area and an underlay network having a narrowband service area at the same time. Hereinafter, in the embodiment of the present invention, the underlay network is referred to as a first network 100 and the overlay network is referred to as a second network 200.

Herein, the first network 100 and the second network 200 are overlapped with each other. Of course, in the embodiment of the present invention, for convenience of description, although the heterogeneous network in which the first network 100 and the second network 200 are overlapped with each other is shown, networks having more different service areas can be implemented in heterogeneous networks which are overlapped with each other.

An example in which the portable terminal according to the embodiment of the present invention is an SCA-based SDR terminal will be described. Of course, the portable terminal is not limited to the SDR terminal.

Herein, a software communications architecture is a standardized communication software architecture proposed to remarkably enhance an interoperability between communication systems and decrease development and installation costs.

The SCA adopts a real-time operating system (OS) and a common object request broker architecture (CORBA) which is the industry standard of a distribution object model as middleware and provides an integrated environment of heterogeneous hardware and software. Herein, the SCA is not a specification which is limited to a predetermined system but is an independent system design framework.

In the SCA, an application that performs one waveform function binds up a plurality of components into one package to install and dispose one package and drives the package. A representative example of adopting the SCA includes the SDR terminal. The SDR terminal adopts the SCA as a standard of a software framework.

The SDR terminal based on the SCA performs a series of terminal reconfiguration processes by downloading wireless connection application software constituted by only software having limited hardware from an SDR server, and installing, disposing, and driving the wireless connection application software.

The SDR terminal 300 performs vertical handoff when moving from the second network 200 to the first network or from the first network 100 to the second network 200.

Herein, the SDR terminal 300 is a terminal device adopting an SDR technology and SDR is an abbreviation of software defined radio and means a software-based wireless communication.

A software module in the SCA-based SDR terminal 300 includes a basic real-time operating system and CORBA middleware specifying an SCA specification. In the SDR terminal 300, a plurality of components such as a domain manager, a device manager, a device, an application factory, a domain profile, etc. as a reconfiguration core framework based on the SCA are disposed on the real-time operating system and the CORBA middleware.

Meanwhile, an SDR server 400 in which information related to the first network 100 and the second network 200 is registered is provided. Herein, the network-related information registered in the SDR server 400 is wireless connection application software of the corresponding network.

That is, the SDR terminal 300 is provided with the wireless connection application software for performing handoff to the first network 100 or the second network 200 from the SDR server 400. Accordingly, the SDR terminal 300 constructs a wireless communication environment for the corresponding network by using the wireless connection application software provided from the SDR server 400.

In other words, the SDR terminal 300 can implement various communication modules in software by adopting the wireless connection application software of various modes in a single hardware platform. Herein, the wireless connection application means a wireless connection service mode that is currently operated. The wireless connection application is packaged into a plurality of components and is disposed and driven in the device to perform a wireless connection function in the corresponding SDR terminal 300.

At this time, the SDR terminal 300 completes a preparation process for performing the handoff by downloading and installing the wireless connection application software related to the first network 100 or the second network 200 from the SDR server 400 and completes a preparation process for performing the handoff and disposing the wireless connection application software in the corresponding device of the SDR terminal 300, before attempting the handoff.

Thereafter, when the SDR terminal 300 performs the handoff from the first network 100 or the second network 200 when the handoff is determined by verifying a registered handoff policy.

A handoff performance operation will be described in detail with reference to FIGS. 2 to 5.

FIGS. 2 to 5 illustrate a handoff performance process between heterogeneous networks in a portable terminal according to an embodiment of the present invention.

Figure 2:
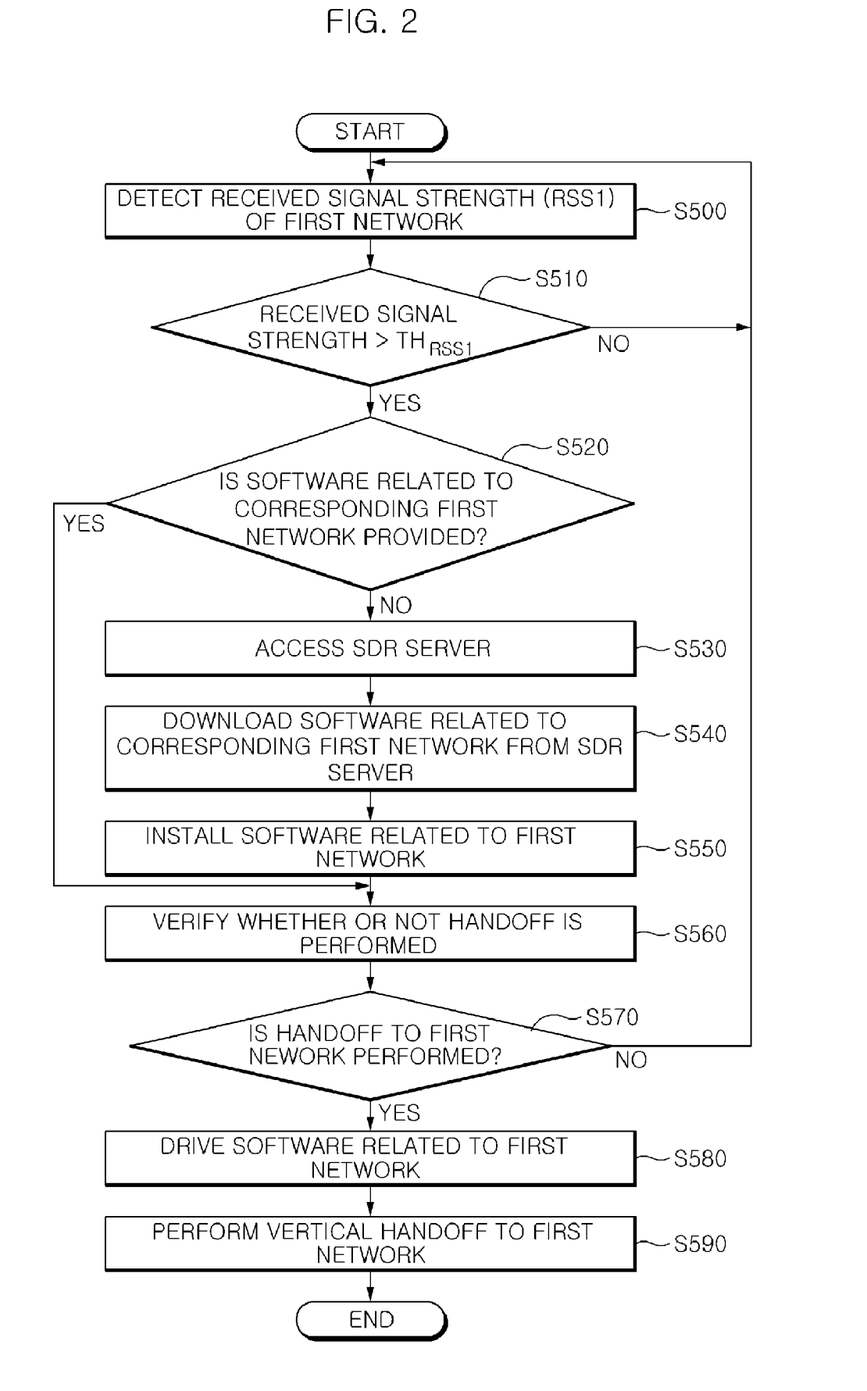
FIG. 2 is a flowchart illustrating a process in which a portable terminal performs handoff from a first network to a second network according to an embodiment of the present invention.
Figure 3:
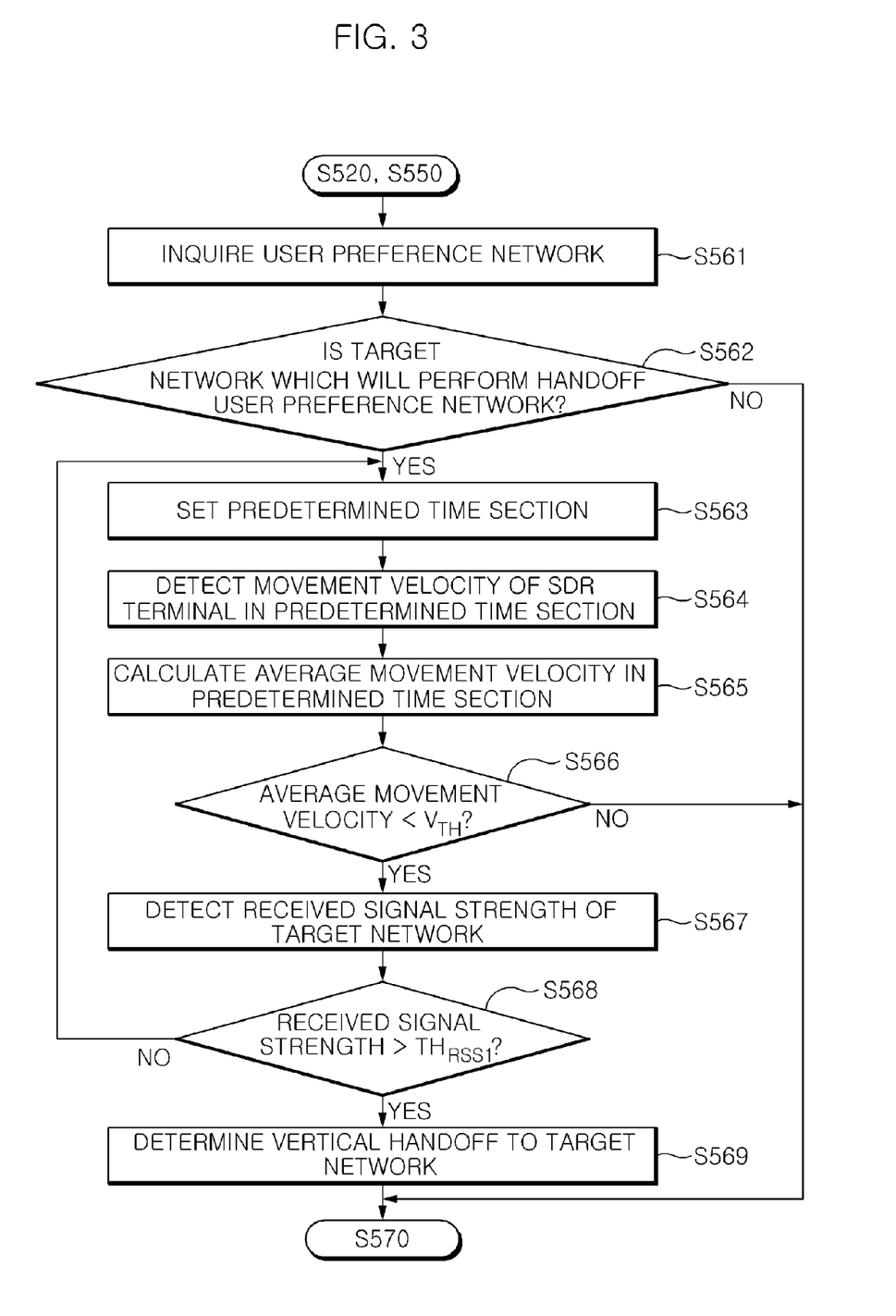
FIG. 3 is a flowchart illustrating a process of determining whether or not handoff is performed in FIG. 2.
Figure 4:
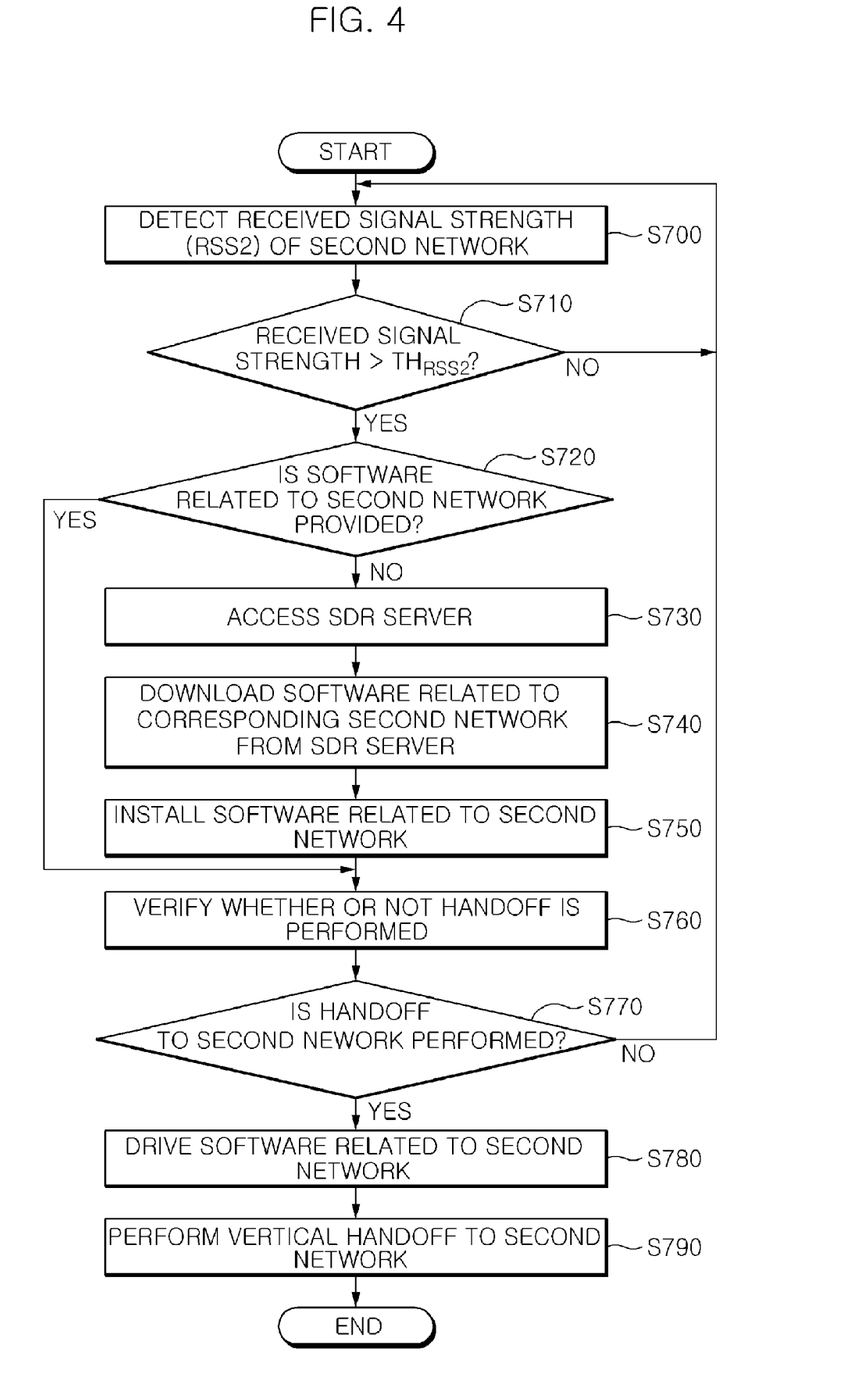
FIG. 4 is a flowchart illustrating a process in which a portable terminal performs handoff from a second network to a first network according to an embodiment of the present invention.
Figure 5:
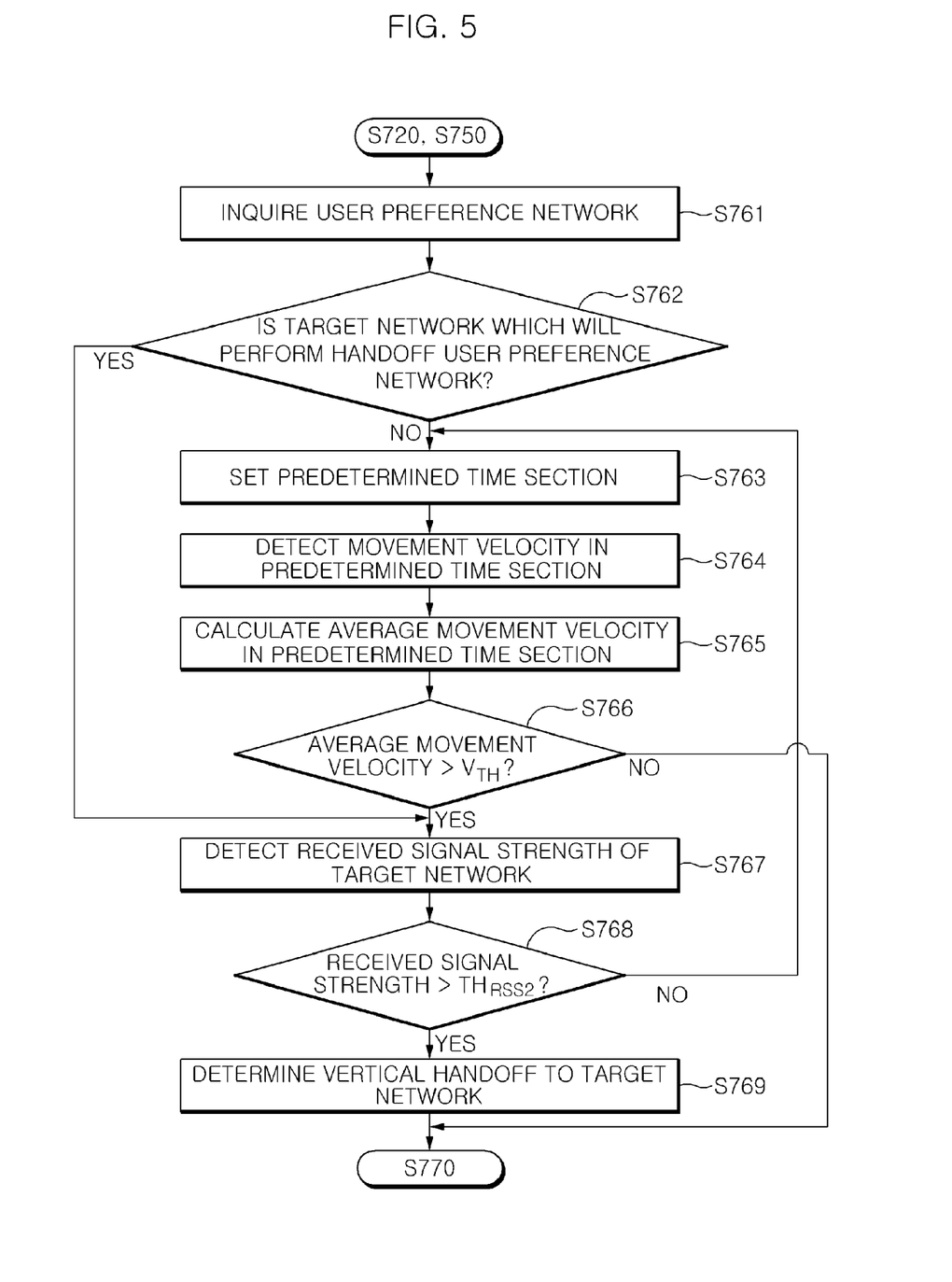
FIG. 5 is a flowchart illustrating a process of determining whether or not handoff is performed in FIG. 4.

In particular, FIGS. 2 and 3 illustrate the handoff performance process from the second network to the first network and FIGS. 4 and 5 illustrate the handoff performance process from the first network to the second network.

First, in FIG. 2, a serving network that provides a communication service is a second network 200 and a target network is a first network 100a. An SDR terminal 300 detects a receive signal strength 1 RSS1 from the first network 100a by using the first network 100a as the target network while being connected to the second network 200 (S500). At this time, the SDR terminal 300 compares a first reference strength $TH_{RSS1}$ with the receive signal strength RSS1 from the first network 100a detected during step 'S500'. If the detected receive signal strength RSS1 from the first network 100a is equal to or less than the first reference strength $TH_{RSS1}$ (S510), the SDR terminal 300 returns to step 'S500' again and waits until the receive signal strength from the first network 100a is larger than the first reference strength $TH_{RSS1}$.

Meanwhile, if the detected receive signal strength RSS1 from the first network 100a is larger than the first reference signal $TH_{RSS1}$ (S510), the SDR terminal 300 verifies whether the software related to the first network 100a is provided in the corresponding SDR terminal 300 (S520). If the software related to the first network 100a is not provided in the corresponding SDR terminal 300, the SDR terminal 300 accesses an SDR server 400 that provides network-related software (S530) and downloads the software related to the first network 100a (S540). At this time, the software downloaded from the SDR server 400 is wireless connection application software of the first network 100a.

Accordingly, the SDR terminal 300 can shorten a time required to reconfigure a system in the SDR terminal 300 at the time of performing handoff by previously installing and disposing the software provided from the SDR server 400 depending on a receive signal strength from a corresponding target network, prior to performing the handoff to the target network that will perform the handoff.

When the software related to the first network 100a is downloaded, the SDR terminal 300 installs the downloaded software and disposes the software in a corresponding device in the SDR terminal 300 (S550).

Meanwhile, when the software related to the first network 100a is previously installed in the SDR terminal 300, steps 'S530' to 'S550' will be omitted. Of course, when the related software is provided but not installed, only step 'S550' can be separately performed.

When the software related to the first network 100a is installed and disposed, whether or not the handoff to the first network 100a is determined by inquiring a handoff policy registered in the SDR terminal 300 (S560). At this time, the SDR terminal 300 determines whether or not the handoff to the first network 100a is performed by considering a user preference network and an average movement velocity in a predetermined time section, etc. A detailed embodiment thereof will be described with reference to FIG. 3.

At this time, when the handoff to the first network 100a is determined at step 'S560' (S570), the SDR terminal 300 configures a wireless connection environment for the first network 100a by driving the software related to the first network 100a (S580) and performs vertical handoff to the first network 100a (S590).

FIG. 3 illustrates a detailed configuration for step 'S560', that is, a process of determining whether or not the handoff is performed in FIG. 2. Referring to FIG. 3, the SDR terminal 300 first inquires the user preference network from the handoff policy registered in the corresponding SDR terminal 300 (S561) and verifies whether the target network that will perform the handoff is the user preference network (S562).

If the target network does not correspond to the user preference network, the SDR terminal 300 returns to step 'S500' of FIG. 2 and waits.

Meanwhile, when the target network corresponds to the user preference network, the SDR terminal 300 sets a predetermined time section (S563) and measures a movement velocity of the corresponding SDR terminal 300 in the set predetermined time section (S564). The SDR terminal 300 measures a movement velocity at a predetermined time interval by repetitively performing step 'S564' until deviating from the time section set at step 'S563'.

Thereafter, when the SDR terminal 300 deviates from the time section set at step 'S563', an average movement velocity in the corresponding time section is calculated on the basis of the movement velocity measured at step 'S564' (S565).

The SDR terminal 300 compares a reference movement velocity $V_{TH}$ with the average movement velocity calculated at step 'S565'. If the calculated average movement velocity is equal to or larger than the reference movement velocity $V_{TH}$ (S566), the SDR terminal 300 returns to step 'S500' of FIG. 2 and redetects the receive signal strength from the first network 100a.

On the other hand, if the calculated average movement velocity is smaller than the reference movement velocity $V_{TH}$ (S566), the SDR terminal 300 redetects the receive signal strength from the first network 100a which is the target network (S567). At this time, when the receive signal strength from the detected target network is still larger than the first reference strength $TH_{RSS1}$ (S568), the SDR terminal 300 determines the vertical handoff to the target network (S569).

If the receive signal strength from the redetected target network is equal to or smaller than the first reference strength $TH_{RSSI1}$ (S568), the SDR terminal 300 returns to step 'S563' and reperforms the steps starting from step 'S563'.

That is, according to the embodiment of the present invention, since whether or not the handoff between the heterogeneous networks is performed is determined by considering the user preference specification in addition to network characteristics such as the average movement velocity in the predetermined time section, the receive signal strength, etc. as shown in FIG. 3, it is possible to prevent a ping-pong phenomenon from being generated due to the handoff between the heterogeneous networks.

Meanwhile, in FIG. 4, the serving network is a first network 100b and the target network is the second network 200. An SDR terminal 300a detects a receive signal strength 2 RSS2 from the second network 200 by using the second network 200 as the target network while being connected to the first network 100b (S700). At this time, the SDR terminal 300a compares the detected receive signal strength RSS2 from the second network 200 at step 'S700' with a second reference strength $TH_{RSS2}$. If the detected receive signal strength RSSI2 from the second network 200 is equal to or less than the second reference strength $TH_{RSS2}$ (S710), the SDR terminal 300a returns to step 'S700' again and waits until the receive signal strength RSSI2 from the second network 200 is larger than the second reference strength $TH_{RSS2}$.

Meanwhile, if the detected receive signal strength RSSI2 from the second network 200 is larger than the second reference signal $TH_{RSS2}$ (S710), the SDR terminal 300a verifies whether the software related to the second network 200 is provided in the corresponding SDR terminal 300a (S720). If the software related to the second network 200 is not provided in the corresponding SDR terminal 300a, the SDR terminal 300a accesses the SDR server 400 that provides the network-related software (S730) and downloads the software related to the second network 200 (S740). At this time, the software downloaded from the SDR server 400 is wireless connection application software of the second network 200.

Accordingly, the SDR terminal 300a can shorten a time required to reconfigure a system in the SDR terminal 300a at the time of performing handoff by previously installing and disposing the software provided from the SDR server 400 depending on a receive signal strength from an overlay network, prior to performing the handoff from an underlay network to the overlay network.

When the software related to the second network 200 is downloaded from the SDR server 400, the SDR terminal 300a installs the downloaded software and disposes the software in a corresponding device in the SDR terminal 300a (S750).

Meanwhile, when the software related to the second network 200 is previously installed in the SDR terminal 300a, steps 'S730' to 'S750' will be omitted. Of course, when the related software is provided but not installed in the corresponding SDR terminal 300a, only step 'S750' can be separately performed.

When the software related to the second network 200 is installed and disposed, whether or not the handoff to the second network 200 is performed is determined by inquiring a handoff policy registered in the SDR terminal 300a (S760). At this time, the SDR terminal 300a determines whether or not the handoff to the second network 200 is performed by considering the user preference network and an average movement velocity of the corresponding terminal in a predetermined time section, etc. A detailed embodiment thereof will be described with reference to FIG. 5.

At this time, when the handoff to the second network 200 is determined at step 'S760' (S770), the SDR terminal 300a configures a wireless connection environment for the second network 200 by driving the software related to the second network 200 (S780) and performs vertical handoff to the second network 200 (S790).

FIG. 5 illustrates a detailed configuration for step 'S760', that is, a process of determining whether or not the handoff is performed in FIG. 4. Referring to FIG. 5, the SDR terminal 300a first inquires the user preference network from the handoff policy registered in the corresponding SDR terminal 300a (S761) and verifies whether the target network that will perform the handoff is the user preference network (S762).

When the target network does not correspond to the user preference network, the SDR terminal 300a sets a predetermined time section (S763) and measures a movement velocity of the corresponding SDR terminal 300a in the set time interval (S764). The SDR terminal 300a measures a movement velocity at a predetermined time interval by repetitively performing step 'S764' until deviating from the time section set at step 'S763'.

Thereafter, when the SDR terminal 300a deviates from the time section set at step 'S763', an average movement velocity in the corresponding time section is calculated on the basis of the movement velocity measured at step 'S764' (S765).

The SDR terminal 300a compares a reference movement velocity $V_{TH}$ with the average movement velocity calculated at step 'S765'. If the calculated average movement velocity is equal to or smaller than the reference movement velocity $V_{TH}$ (S766), the SDR terminal 300a returns to step 'S700' of FIG. 4 and redetects the receive signal strength RSSI2 from the second network 200.

On the other hand, when the calculated average movement velocity is larger than the reference movement velocity $V_{TH}$ (S766), the SDR terminal 300a redetects the receive signal strength from the target network (S767). At this time, when the receive signal strength from the target network redetected at step 'S767' is still larger than the second reference strength $TH_{RSS2}$ (S768), the SDR terminal 300a determines the vertical handoff to the second network which is the target network (S769).

If the receive signal strength redetected from the target network is equal to or smaller than the second reference strength $TH_{RSS2}$ (S768), the SDR terminal 300a returns to step 'S763' and reperforms the steps starting from step 'S763'.

Meanwhile, when the target network corresponds to the user preference network at step 'S762', the SDR terminal 300a directly performs the steps after step 'S767' without performing steps 'S763' to 'S766'. At this time, when the receive signal strength redetected from the target network is still larger than the second reference strength $TH_{RSS2}$ (S768), the SDR terminal 300a determines the vertical handoff to the second network 200 which is the target network (S769).

As described above, in a method for handoff of a portable terminal between heterogeneous wireless networks according to the present invention, the configuration and method of the embodiments described as above can limitatively not be adopted, but the embodiments may be configured by selectively combining all the embodiments or some of the embodiments so that various modifications can be made.

What is claimed is:

1. A method for a handoff of a portable terminal from a serving network to a target network, the serving network and the target network being heterogeneous networks having overlapping service areas, comprising: setting a reference strength corresponding to the serving network;
    verifying whether or not the strength of a first signal received from the target network is larger than the reference strength;
    installing software related to the target network in the portable terminal when the strength of the first signal is larger than the reference strength;
    determining whether or not the handoff to the target network is performed by inquiring a handoff policy registered in the portable terminal, including
        measuring a movement velocity of the portable terminal in a predetermined time section, and
        calculating an average movement velocity in the predetermined time section using the measured movement velocity;
    verifying whether or not the strength of a second signal received from the target network is larger than the reference strength;
    configuring a wireless connection environment with the target network by driving the software related to the target network and performing the handoff to the target network when the strength of the second signal is larger than the reference strength; and
    when the strength of the second signal is not larger than the reference strength, recalculating the average movement velocity in the predetermined time section.

2. The method according to claim 1, wherein the reference strength includes at least one of a first reference strength that is a reference strength of a received signal for an overlay network having a broadband service area, and a second reference strength that is a reference strength of a received signal for an underlay network having a narrowband service area which has a service area overlapping that of the overlay network.

3. The method according to claim 1, wherein the software related to the target network is wireless connection application software that provides the wireless communication environment between the portable terminal and the target network.

4. The method according to claim 1, further comprising, before the installing software related to the target network:
    verifying whether or not the software related to the target network is provided in the portable terminal; and
    receiving the software related to the target network from an SDR (software defined radio) server when the software related to the target network is not provided in the portable terminal.

5. The method according to claim 1, wherein the handoff policy includes at least one of user preference network information, reference velocity information in a predetermined time section, and reference receive signal strength information to the target network.

6. The method according to claim 1, wherein the determining whether or not the handoff is performed includes verifying whether or not the target network is a user preference network by inquiring a user preference network defined in the handoff policy.

7. The method according to claim 6, wherein the handoff to the target network is performed only when the target network is the user preference network in a case when the target network is an underlay network.

8. The method according to claim 1, wherein when the target network is an underlay network, the handoff to the target network is performed when the calculated average movement velocity is less than a reference velocity.

9. The method according to claim 1, wherein when the target network is an overlay network, the handoff to the target network is performed when the calculated average movement velocity is larger than a reference velocity.

* * * * *